Aug. 15, 1950     T. J. CAVES     2,519,176
LAWN SHEARS
Filed July 22, 1948
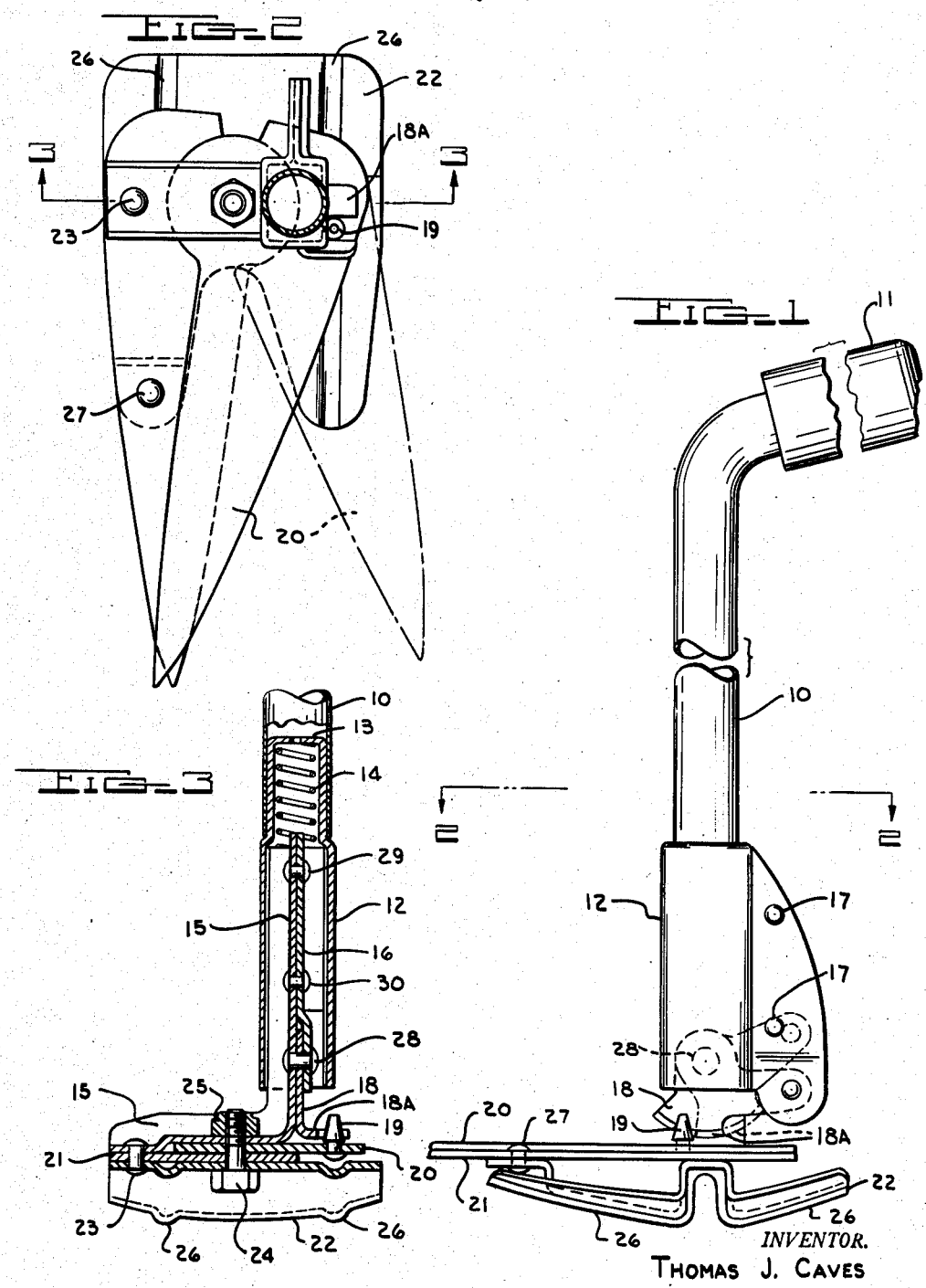
INVENTOR.
THOMAS J. CAVES
BY
ATTORNEY Patented Aug. 15, 1950

2,519,176

UNITED STATES PATENT OFFICE 2,519,176

LAWN SHEARS

Thomas J. Caves, Dearborn, Mich.

Application July 22, 1948, Serial No. 40,131

2 Claims. (Cl. 56—241)

The present invention relates to lawn shears which are particularly adapted for cutting grass, weeds, and the like.

The principal object of the present invention is to provide lawn shears adapted for cutting weeds or grass near walls or other obstructions, said shears comprising a fixed blade and a pivotally mounted movable blade wherein the movable blade is so arranged with its activating means as to eliminate to a great extent, the sticking together or binding of the blades which is a source of annoyance in most lawn shear constructions.

Another object of the present invention is to provide lawn shears which are convenient to use and which are economical to manufacture by mass production methods.

A further object of the present invention is to provide lawn shears for use while standing erect which are easily used and function well in a tilted position.

Other objects of this invention will appear in the following description and appended claims, reference being had to the accompanying drawings forming a part of this specification wherein like reference characters designate corresponding parts in the several views.

In the drawings:

Fig. 1 is a side elevation of the lawn shears of the present invention with part of the handle member and grip broken away to conserve space.

Fig. 2 is a plan view taken along the line 2—2, Fig. 1.

Fig. 3 is a sectional view taken along the line 3—3, Fig. 2.

The lawn shears of the present invention include a tubular handle member 10 slightly bent at the upper end and equipped with a rubber grip 11. At the lower end of the handle member 10, a housing member 12 is provided which extends downwardly below the handle member 10 and which also extends upwardly inside the handle member 10. The top of the housing 12 is provided with inturned lugs 13 which form a seat for the upper end of a compression spring 14. The lower end of the spring 14 is seated on top of two vertical rigid brackets 15 and 16 which are fastened together within the housing 12 by the rivets 29 and 30. The housing 12 is composed of two opposed stampings held together by the rivets 17. The rear portion of said housing 12 is attached pivotally to one end of an activating lever 18. The activating lever 18 is a bell crank type lever with one end bent and extending at right angles to the plane of movement of the lever to form an arcuate flange 18A. Said flange 18A is provided with a slot which lies at right angles to the plane of movement of the activating lever 18 to accommodate the rivet or movable shear lug 19 which is affixed to the movable shear blade 20. The activating lever 18 is pivotally secured between the brackets 15 and 16 by the rivet 28. The portion of the lug 19 extending above the movable shear blade 20 is formed in the shape of a truncated cone.

A fixed shear blade 21 is held rigidly between the bracket 15 and the ground contacting member 22 by means of the rivet 23. The ground contacting member 22 is also secured on one side to the fixed blade 21 by the rivet 27. The ground contacting member 22, fixed blade 21, bracket 15, and movable shear blade 20 have a centrally located hole to allow passage of the bolt 24 which is held in place by the nut 25.

The lawn shears of the present invention are shown in the closed position in the drawings. The open position of the movable blade 20 is shown in phantom, Fig. 2, and the open position of the activating lever 18 is shown in phantom in Fig. 1.

By forming the upper part of the rivet or lug 19 in the shape of a truncated cone, and providing a slotted arcuate flange on the activating lever 18, a relationship exists which eliminates most of the cause of blade binding or sticking which is experienced in lawn shears of the type of the present invention. As the activating lever moves through a downward and forward arc, the lug 19 and consequently the movable blade 20 is moved pivotally around the bolt 24. This action of the lug 19 in the slot of the activating lever 18 is comparable to a meshed gear action, and since the lug 19 is tapered, friction is reduced so that there is no tendency for the movable blade 20 to stick in the closed position.

To operate the device of the present invention, assuming the downwardly exerted force on the handle member 10 has been released and the movable shear blade 20 and activating lever 18 are in the position indicated by the broken lines, the ground contacting plate 22 is placed on the ground, and a force is exerted downward on the handle member 10 and transmitted to the housing 12 which is fitted within the said handle member 10. The ground surface provides a reaction force against the ground contacting plate 22, and the tubular handle member 10 and housing 12 slide vertically downward along the pair of vertical rigid brackets 15 and 16 thus compressing the spring 14. This downward force is also transmitted through the housing 12 to the bell crank lever 18 and the lever pivots about the rivet 28. The lug 19 secured to the movable blade 20, and which fits into the end of the activating lever 18, at the same time effects the pivotal movement of the movable shear blade 20 about the central pivot bolt 24. This action causes the movable shear blade 20 to pivot toward the cutting edge of the fixed shear blade 21. The desired cutting action is provided when the cutting edge of the movable blade 20 is moved across the cutting edge of the fixed blade 21.

Upon removing the downward force from the handle member 10, the spring 14 returns to its initial position thus forcing the housing 12 and handle member 10 vertically upward to their original positions. The housing 12 is raised, the bell crank lever 18 is pivoted about the rivet 28 in the opposite direction, the shear lug 19 moves backward, and the movable shear blade 20 is pivoted away from the fixed shear blade 21. The rear portions of the blades are slightly bent to form stops which are in contact when the blades are in the inoperative or open position.

In forming the ground contacting foot member with the ribs 26, added strength is provided. Also, since the foot member 22 is arcuate, the shears will function equally well when tilted forward or backward as when used in a vertical position.

Having thus described my invention, I claim:

1. Lawn shears comprising a ground contacting plate, a vertically disposed rigid bracket member secured at its lower end to said ground contacting plate, a fixed blade secured between said ground contacting plate and said bracket member; a movable blade pivotally mounted between said ground contacting plate and said bracket member for pivotal movement with respect to said fixed blade, said movable blade having a lug in the form of a truncated cone extending vertically upward therefrom and spaced radially from the point of pivotal movement thereof; a housing mounted about the upper end of said bracket member and vertically movable relative thereto, a coil spring seated at its one end on said bracket member and at its other end in said housing for biasing said housing vertically upward, a handle secured to said housing and extending vertically upward therefrom for moving said housing vertically downward in opposition to said coil spring, a bell crank lever pivotally connected at its fulcrum to said bracket member for movement in a vertical plane, a force applying member rigidly secured to said housing, one arm of said bell crank lever being pivotally connected to said force applying member, the other arm of said bell crank lever having a slot therein for receiving said lug, said bell crank lever, force applying member and lug being so constructed and arranged that said one arm will be substantially normal to the path of vertical movement of said force applying member and said other arm will be substantially normal to the path of movement of said lug during closing and opening of said lawn shears.

2. In a lawn shears, a vertically disposed rigid bracket member, a fixed blade rigidly secured to the lower end of said bracket member, a movable blade pivotally mounted on the lower end of said bracket member for pivotal movement with respect to said fixed blade, said movable blade having a lug in the form of a truncated cone extending vertically upward therefrom and spaced radially from the point of pivotal movement thereof, a vertical force applying member operatively mounted on said bracket member for vertical movement with respect thereto, a bell crank lever pivotally connected at its fulcrum to said bracket member for movement in a vertical plane, one arm of said bell crank lever being pivotally connected to said force applying member, and the other arm of said bell crank lever having a slot therein at its outer end for receiving said lug of said movable blade, said bell crank lever, force applying member and lug being so constructed and arranged that said one arm will be substantially normal to the path of vertical movement of said force applying member and said other arm will be substantially normal to the path of movement of said lug during closing and opening of said lawn shears.

THOMAS J. CAVES.

REFERENCES CITED

The following references are of record in the file of this patent:

UNITED STATES PATENTS

| Number | Name | Date |
| --- | --- | --- |
| 756,227 | Fisk | Apr. 5, 1904 |
| 1,222,950 | Heidt | Apr. 17, 1917 |
| 1,275,307 | Saile | Aug. 13, 1917 |
| 1,741,172 | Huxman | Dec. 31, 1929 |
| 1,799,087 | Carpenter | Mar. 31, 1931 |